United States Patent [19]

Honda

[11] Patent Number: 4,928,129

[45] Date of Patent: May 22, 1990

[54] PRINTING APPARATUS

[75] Inventor: Iwakazu Honda, Nara, Japan

[73] Assignee: Sharp Kabushiki Kaisha, Osaka, Japan

[21] Appl. No.: 343,197

[22] Filed: Apr. 25, 1989

[30] Foreign Application Priority Data

| | | | |
|---|---|---|---|
| Apr. 30, 1988 | [JP] | Japan | 63-59128[U] |
| May 13, 1988 | [JP] | Japan | 63-117470 |
| May 13, 1988 | [JP] | Japan | 63-63883[U] |
| May 13, 1988 | [JP] | Japan | 63-63884[U] |
| May 31, 1988 | [JP] | Japan | 63-73064[U] |
| May 31, 1988 | [JP] | Japan | 63-73065[U] |
| Jun. 15, 1988 | [JP] | Japan | 63-79102[U] |

[51] Int. Cl.[5] .............................................. G01D 15/00

[52] U.S. Cl. ..................................... 346/160; 346/145

[58] Field of Search ............... 346/160, 145, 134, 136; 271/110, 111; 355/308, 321; 400/624, 525

[56] References Cited

U.S. PATENT DOCUMENTS

| | | | |
|---|---|---|---|
| 4,763,891 | 8/1988 | Kodama | 271/111 |
| 4,785,319 | 11/1988 | Fujino et al. | 346/145 |

FOREIGN PATENT DOCUMENTS

| | | | |
|---|---|---|---|
| 61-68038 | 8/1986 | Japan | 346/160 |
| 61-295943 | 12/1986 | Japan | 346/160 |

*Primary Examiner*—Arthur G. Evans

*Attorney, Agent, or Firm*—Irell & Manella

[57] ABSTRACT

A printing apparatus comprising a housing; a paper receiving member disposed within the housing for receiving printed copy sheets; a paper cassette for holding copy sheets to be printed, disposed on the back of the paper receiving member so that the copy sheets are covered with the paper receiving member; and a paper conveyor disposed below the paper cassette for transporting copy sheets from the paper cassette to the paper receiving member, an image forming means being placed between the paper cassette and the paper conveyor so that the toner image is transferred onto a copy sheet passing through the paper conveyor.

12 Claims, 9 Drawing Sheets

PRINTING APPARATUS

BACKGROUND OF THE INVENTION

1. Field of the Invention:

The invention relates to a printing apparatus such as a laser printer, a LED printer, and the like, which forms an image on a sheet of copy paper.

2. Description of the Prior Art:

A variety of office machines including computers have been developed recently and the number of them introduced to each office has been increasing. The more machines one office has, the more difficult it becomes to find room for them. In general, office machines such as computers are placed on desks with their peripheral devices, which occupy large areas placed around these desks. This makes it difficult for workers to move smoothly around them while they are working, resulting in reduced labor efficiency in the office. Therefore, such office machines should be miniaturized so that they do not occupy such large areas.

Printing apparatuses such as laser printers or LED printers, which form an image by electrostatic printing, are often used as the peripheral devices for the office machines, i.e., computers, word processors, or the like.

With a conventional copying apparatus or laser printer, for example, a releasable paper cassette is connected to one side of its main body or housing in such a manner that the cassette protrudes from the housing. A pivoting paper supply roller is disposed above the end of the paper cassette so that the roller is in contact with the paper within the cassette. When the paper supply roller rotates, a sheet of copy paper is transported into a paper conveyer within the housing. The paper conveyer is provided with a photosensitive means, a developing device, a fixing device, and the like. A toner image formed on the photosensitive means by the developing device is transferred onto the sheet of copy paper which has been supplied to the paper conveyer. Then, the transferred toner image is fixed onto the sheet by the fixing device, and the resulting printed-paper is discharged into a paper receiving tray.

The paper receiving tray is usually disposed on the other side of the housing, which is on the opposite side to that having the paper cassette. In this way, with a conventional printing apparatus, the paper cassette and the paper receiving tray usually protrude from the opposite sides of the housing, so that the whole printing apparatus occupies a large area in an office.

Japanese Laid-open Patent Publication No. 63-236052 discloses a printing apparatus in which a face-down tray functioning as the paper receiving tray is disposed on the top of the housing so that the whole printing apparatus occupies a smaller area. However, it still has a paper cassette protruding from the housing, making the whole apparatus inefficient in its use of space.

Moreover, with a conventional printing apparatus, regardless of the position of the paper receiving tray, a paper exit through which sheets of copy paper are discharged out of the housing is disposed on the opposite side of the housing from the paper cassette. Thus, it is difficult to observe the quantity of the paper remaining in the paper cassette and see if the printed paper sheet has come out well at the same time.

A conventional printing apparatus is also disadvantageous in that it is difficult to supply new sheets of copy paper into the paper cassette, to remove a paper cassette or to take out discharged copy sheets.

In general, the paper cassette is provided with a cover which prevents dust or other foreign substances from entering the paper cassette. Attachment of such a cover to the paper cassette naturally means that one component is added to the whole apparatus, resulting in an increase in production cost.

The paper cassette is usually connected to the housing in such a way that it can be removed when new copy sheets are to be supplied. With such an arrangement, additional components for releasably mounting the paper cassette to the housing are required, resulting in an increase in production cost.

A conventional printing apparatus is generally provided with a door which opens into the housing. When a paper conveyer within the housing is jammed with sheets of copy paper, the door can be opened to expose the paper conveyer so that the jammed paper sheets can be removed. With such an arrangement also, additional components, i.e., the door, mounting members for mounting it to the housing, and the like, are required for the whole apparatus, resulting in a complicated structure, which causes an increased production cost of the apparatus.

The paper supply roller for transporting copy sheets from the paper cassette into the housing is usually mounted to the housing. Thus, additional components such as a supporting member or the like for mounting the roller to the housing are required for the production of the whole printing apparatus, resulting in a complicated structure, which causes an increased production cost.

A conventional printing apparatus is also provided with a pair of paper discharge rollers for transporting printed sheets out of the housing. One of the paper discharge rollers is usually attached to a mounting member disposed along the paper conveyer, and the other roller is usually attached to a pivoting supporting member connected to the housing. When the space between the two paper discharge rollers is jammed with copy sheets, the supporting member rotates upward so that the jammed sheets can be removed. With such a printing apparatus, however, since one of the paper discharge rollers is pivotably connected to the housing by means of the supporting member, additional components such as the supporting member and the like are required to be mounted within a printing apparatus. This causes a complicated structure, resulting in an increased production cost of the whole apparatus.

A conventional printing apparatus is also provided with a pair of guide-wall members for guiding a sheet of copy paper transported by the paper discharge rollers to a paper exit. The two guide-wall members face each other and the space therebetween functions as a part of the paper conveyer. These guide-wall members are both attached to the housing, so that additional components such as mounting members or the like for mounting these two guide-wall members to the housing are required. This causes a complicated structure, resulting in an increased production cost.

A laser printer in which a semiconductor laser is used to form a latent image on the photosensitive means has been developed as a printing apparatus. Such a laser printer is usually provided with a reflecting means such as a mirror for reflecting the laser beams emitted from the laser so as to illuminate the photosensitive means. The reflecting member is usually mounted in the housing, so that the additional components such as supporting members and the like for supporting the reflecting means within the housing are needed. This causes a complicated structure, resulting in an increased production cost.

With a printing apparatus, it is necessary to detect the size of the copy paper to control the quantity of toner. For example, Japanese Laid-open Patent Publication No. 60-61426 discloses a paper size detecting device for detecting the size of a copy sheet. With a printing apparatus, it is also necessary to check that the paper cassette is properly placed in the housing. If the printing apparatus is operated without the paper cassette being properly placed, the apparatus may be jammed with copy sheets or may be broken. Thus, a paper cassette checking means for checking that the paper cassette is properly placed is required for a printing apparatus. With a conventional printing apparatus, the above-mentioned paper size detecting device and paper cassette checking means are separately disposed within the housing, so that additional components such as mounting members or wirings are required for these two devices. This causes a complicated structure, resulting in an increased production cost.

SUMMARY OF THE INVENTION

The printing apparatus of this invention, which overcomes the above-discussed and numerous other disadvantages and deficiencies of the prior art, comprises a housing in which an electrostatic image forming means is disposed, said image forming means including a light-emitting section for irradiating a photosensitive means to form a latent image and a developing process section for developing the latent image into a real image with toner, a paper receiving member disposed within the housing for receiving printed copy sheets, a paper cassette for holding copy sheets to be printed, disposed on the back of the paper receiving member so that the copy sheets are covered with the paper receiving member, and a paper conveyer disposed below the paper cassette for transporting copy sheets from the paper cassette to the paper receiving member, said image forming means being placed between the paper cassette and the paper conveyer so that the toner image is transferred onto a copy sheet passing through the paper conveyer.

In a preferred embodiment, the housing is substantially right-angled triangular in section, and said paper receiving member and the paper cassette are disposed along the inclined surface of the housing.

In a preferred embodiment, the upper portion of said paper receiving means is pivotably connected to the housing.

In a preferred embodiment, the paper cassette is detachably mounted within the housing.

In a preferred embodiment, a paper supply roller for transporting copy sheets out of the paper cassette is placed on the back of the paper receiving member.

In a preferred embodiment, a pair of paper discharge rollers for transporting a copy sheet on which a toner image is formed by the image forming means toward the predetermined direction are disposed below the lower end of the paper cassette, one of said paper discharge rollers being incorporated into the paper cassette.

In a preferred embodiment, a pair of guidewall members defining a part of the paper conveyer are disposed below the paper cassette, one of said guidewall members being incorporated into the paper cassette.

In a preferred embodiment, the image forming means includes a laser beam-emitting means as the light-emitting section, and laser beams emitted from the laser beam-emitting means are reflected by a mirror attached to the back of the paper cassette to illuminate the photosensitive means so that a latent image is formed on the photosensitive means.

In a preferred embodiment, a paper size detecting member which can slide in the paper-width direction is disposed within the paper cassette so as to detect the width of the copy paper and to check that the paper cassette is properly placed within the housing.

In a preferred embodiment, the paper cassette is pivotably connected to the housing at its upper end.

In a preferred embodiment, the paper cassette and said paper receiving member are rotatably connected to the housing at a single pivot.

In a preferred embodiment, at least the developing process section is held below said paper cassette by a supporting means..

Thus, one of the objects of the invention described herein is to provide a printing apparatus of a reduced size in which a paper receiving member is placed over a paper cassette, and a paper conveyer extending from one side of the paper cassette to the opposite side of the paper receiving member is disposed below the paper cassette so that the arrangement of the components within the housing comes to be compact, and the paper cassette does not protrude from a housing.

Another object of the invention is to provide a printing apparatus in which a paper cassette is covered with a paper receiving member and accordingly a cover for the paper cassette is not required, resulting in the reduced number of components and a reduced cost.

Still another object of the invention is to provide a printing apparatus in which the paper cassette and the paper receiving member are on the same side of the housing, so that it is easy to take out discharged copied sheets and see if they come out well and to supply new copy paper to the cassette.

A further object of the invention is to provide a printing apparatus in which a paper supply roller for transporting paper out of the paper cassette is attached to the back of the paper receiving member, so that mounting members for mounting the paper supply roller to the housing are not required, resulting in a decrease in the number of components and a simplified structure.

A further object of the invention is to provide a printing apparatus in which one of a pair of paper discharge rollers is attached to the paper cassette, so that the paper discharge roller is naturally moved away from the housing with the removal of the paper cassette, and accordingly any jammed paper can be readily removed, and that mounting members for mounting one of the paper discharge rollers to the housing are not required, resulting in a decrease in the number of components and a simplified structure.

A further object of the invention is to provide a printing apparatus in which one of two guidewall members defining a part of the paper conveyer is incorporated into the paper cassette on the lower end, so that the paper conveyer is exposed when the paper cassette is removed, and thus jammed paper can be readily removed.

A further object of the invention is to provide a printing apparatus in which a reflecting means for reflecting laser beams is attached to the paper cassette, so that supporting members for supporting a mirror of the reflecting means within the housing are not required, resulting in a decrease in the number of components and a simplified structure.

A further object of the invention is to provide a printing apparatus in which a single member functions as a paper size detecting means and a paper cassette checking means, so that mounting members or wirings for only one member are required, and accordingly the structure within the housing is simplified, resulting in a simplified production process and a reduced cost.

A further object of the invention is to provide a printing apparatus in which the paper cassette is connected to the housing so that it pivots and need not be removed and is just rotated when new copy sheets are to be supplied therein, and that mounting members for detachably connecting the paper cassette to the housing are not required, resulting in a reduced number of components, a simplified structure within the housing, and a reduced cost.

A further object of the invention is to provide a printing apparatus in which the paper cassette also functions as a door that opens into the housing, resulting in a reduced number of components, a simplified structure, and a reduced cost.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

EXAMPLE 1

Figure 1:
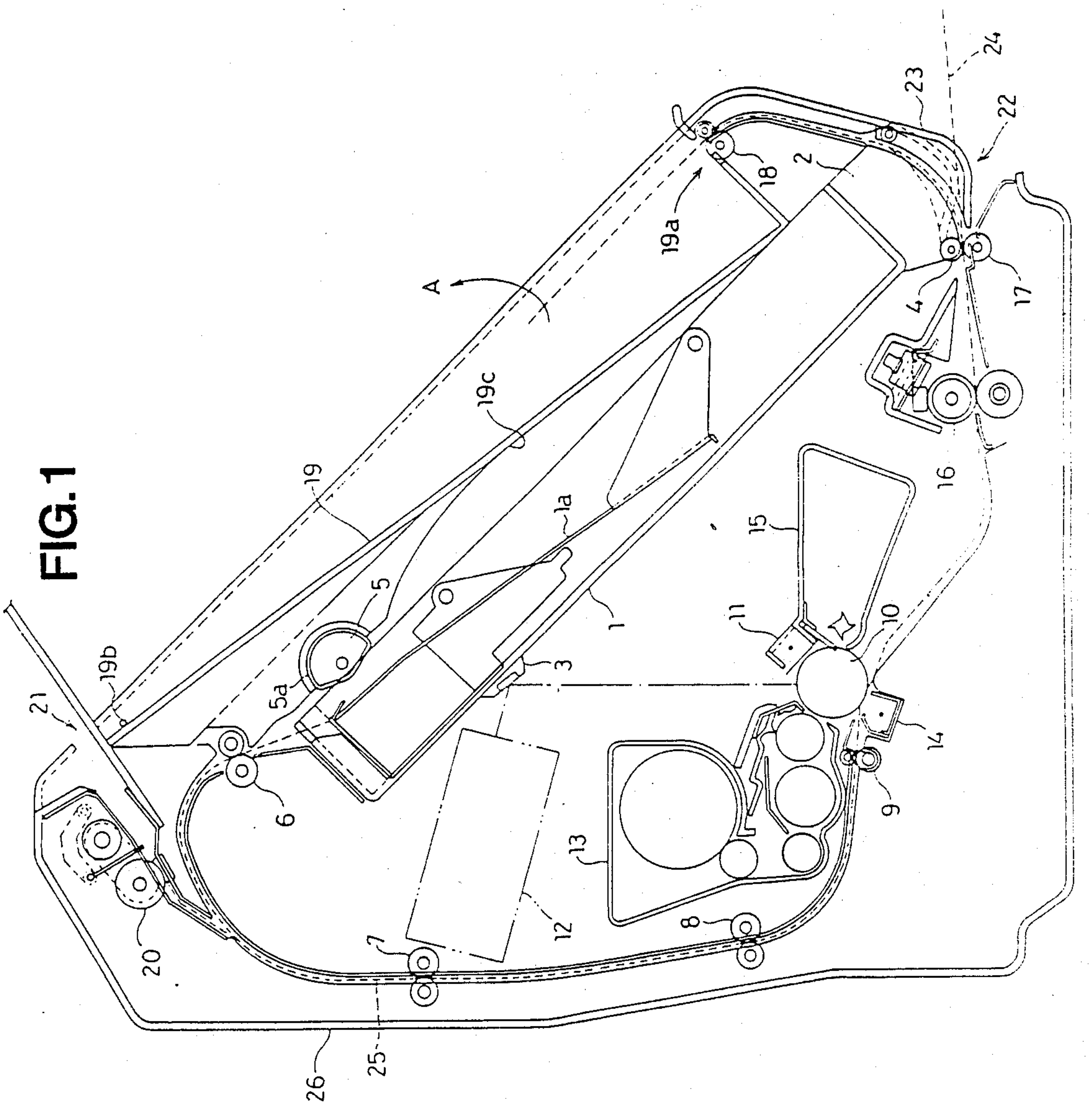
FIG. 1 is a sectional view of a printing apparatus of this invention.
Figure 2:
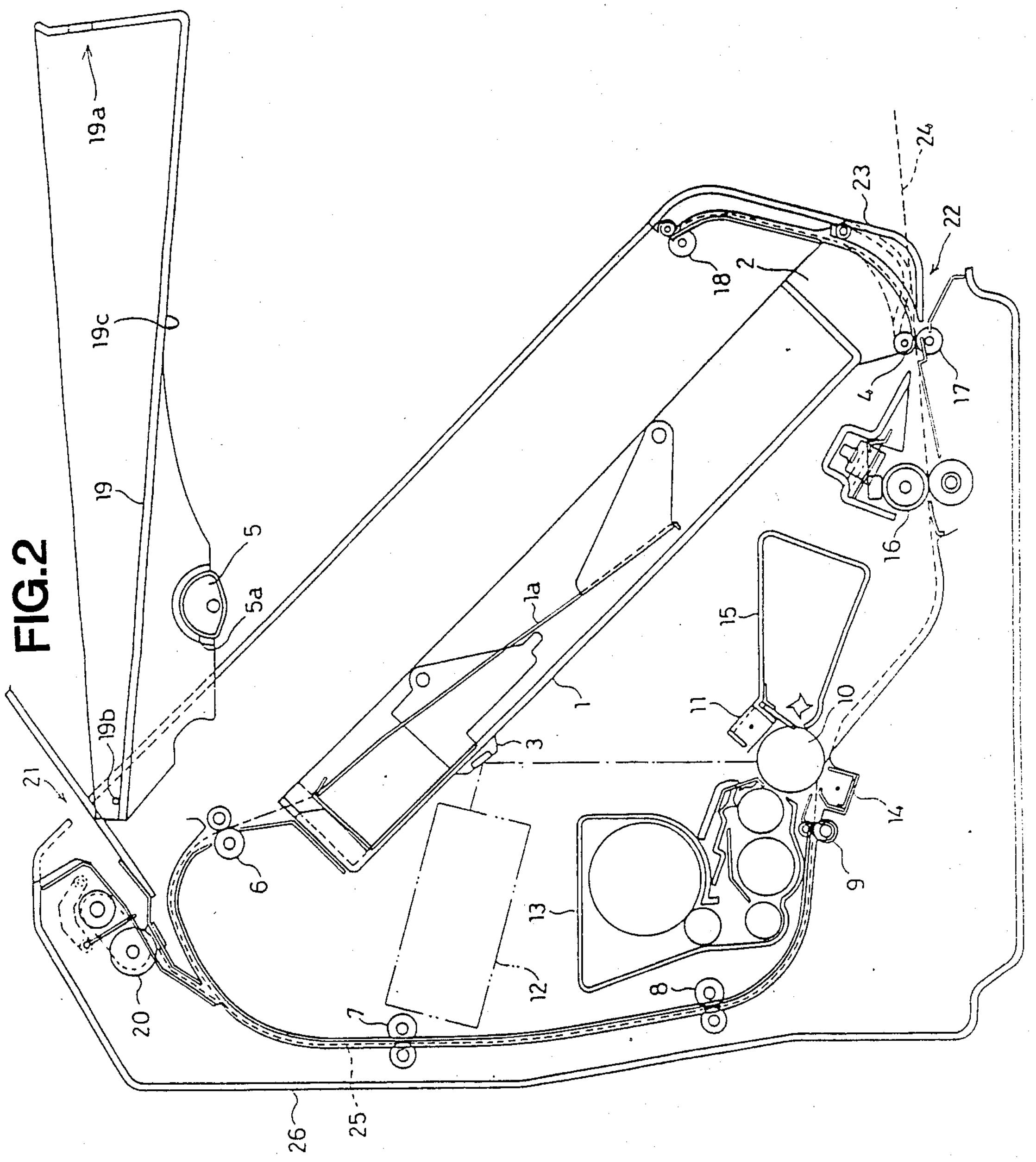
FIG. 2 is a schematic diagram illustrating the function of a face-down tray of the printing apparatus shown in FIG. 1.

FIGS. 1 and 2 show a printing apparatus of the invention. A printing apparatus of this example is a laser printer comprising a housing 26 of substantially right-angled triangular shape in section. The housing 26 has one inclined surface, the top end of which is provided with a manual paper supply member 21 including a paper supply roller 20. A face-down tray 19 made of transparent resin is disposed below the manual paper supply member 21 and along the inclined surface of the housing 26, and is connected to the top of the housing at a pivot **19*b*. The face-down tray 19, which functions as a paper receiving member, has a paper exit 19*a* on its lower-side wall, through which printed paper is discharged into the face-down tray 19 with its printed face downward. A pair of paper discharge rollers 18 are mounted outside the lower-side wall of the face-down tray 19. The paper discharge rollers 18 transport paper through the paper exit 19*a* into the face-down tray 19. A paper cassette 1 which holds copy sheets is attached to the back of the face-down tray 19 with substantially the same inclination as that of the tray 19. A paper supply roller 5 is connected to the backside 19*c* of the face-down tray 19 in such a way that it can rotate. The paper cassette 1 is provided with a rotatable plate 1*a* which pushes paper toward the paper supply roller 5. When the paper supply roller 5 rotates, its round surface 5*a* comes into contact with paper so that the copy sheets can be conveyed out of the paper cassette 1** one by one.

A pair of conveyer rollers 6 are disposed above the paper cassette 1. A paper conveyer 25 extends from the conveyer rollers 6 to the paper exit **19*a* of the face-down tray 19, along two surfaces of the housing 26 which define the substantially right angle in section. The upper portion of the paper conveyer 25 also communicates with the manual paper supply member 21, from which paper is supplied by hand and transported into the paper conveyer 25 by means of the paper supply roller 20. A photosensitive drum 10 is disposed in the vicinity of the right-angled bend of the paper conveyer 25. Three pairs of conveyer rollers 7, 8, and 9 are placed between the paper supply roller 20 and the photosensitive drum 10 along the paper conveyer 25 in that order. A main charger 11 which charges the photosensitive drum 10, a developing device 13 which develops a latent image formed on the photosensitive drum 10 into a toner image, a transfer charger 14 which transfers a toner image on the photosensitive drum 10 onto a copy sheet, and a cleaning device 15 which removes toner attached to the photosensitive drum 10 are all disposed around the photosensitive drum 10**, constituting a developing process section.

In this way, with a laser printer of this example, the face-down tray 19, the paper cassette 1, and the developing process section including the photosensitive drum 10 are aligned one above the other as shown in FIG. 1.

A fixing device, which comprises a pair of heat rollers 16 vertically aligned, is disposed between the photosensitive drum 10 and the paper exit **19*a* along the paper conveyer 25. The fixing device, which is a part of an image forming section, fixes a toner image transferred from the photosensitive drum 10** onto paper by means of heat.

A pair of paper discharge rollers 4 and 17 are vertically aligned across the paper conveyer 25 away from the heat rollers 16 in the direction of paper transportation. A guide-wall member 2 and a conveyer changing member 23 are placed apart facing each other away from the paper discharge rollers 4 and 17 in the direction of paper transportation. The space between the guide-wall member 2 and the conveyer changing member 23 functions as a part of the paper conveyer 25. The guide-wall member 2 is mounted on the outside of the lower-side wall of the paper cassette 1. The upper paper discharge roller 4 is mounted on the backside wall of the guide-wall member 2. The other paper discharge roller 17 is attached to the housing 26.

The bottom surface of the guide-wall member 2 defines one side wall of the paper conveyer 25. The side wall curves upward so that the paper conveyer 25 curves accordingly. The conveyer changing member 23, the top of which is pivotably connected to the housing 26 in such a way that it may pivot, also curves upward and is kept apart from the guide-wall member 2 so that the space therebetween functions as a part of the paper conveyer 25. When the conveyer changing member 23 pivots upward on its top end, it opens a branch paper-discharge passage 24 as indicated by the broken lines in the figures. The branch paper-discharge passage 24 leads to an exit 22 through which printed paper is discharged out by means of the paper discharge rollers 4 and 17.

The guide-wall member 2 can be incorporated into the paper cassette 1, and it can also be separately manufactured to be connected to the paper cassette 1.

A mirror 3 is attached to the back of the paper cassette 1. A semiconductor laser 12, which is indicated by the line of dashes and double dots in the figures, is placed between the paper cassette 1 and the paper conveyer 25. Laser beams emitted from the semiconductor laser 12 are reflected by the mirror 3 so as to illuminate the photosensitive drum 10. The light path is indicated by the dash-dot line in the figures.

In the printing operation, as the photosensitive drum 10 rotates, its surface is charged at the time when it faces the main charger 11. Then, the laser beams emitted from the semiconductor laser 12 are reflected by the mirror 3 to illuminate the photosensitive drum 10. As a result, only the light-exposed surface thereof is discharged so that a latent image is formed. When the surface on which the latent image is formed faces the developing device 13, toner is applied thereto so that the latent image is developed, resulting in a toner image.

A copy sheet is supplied from the manual paper supply member 21 and transported into the paper conveyer 25 by the paper supply roller 20, or it is supplied from the paper cassette 1 and transported into the paper conveyer 25 by the paper supply roller 5 and the conveyer rollers 6. Then, the copy sheet is transported to the photosensitive drum 10 by the conveyer rollers 7, 8, and 9. The above-mentioned toner image formed on the photosensitive drum 10 is transferred onto the copy sheet by the transfer charger 14. The transferred toner image is then fixed with heat by means of the heat rollers 16. Thereafter, the copy sheet is transported by the paper discharge rollers 4 and 17 to the exit 22 through the branch paper-discharge passage 24 defined by the conveyer changing member 23, or it is transported into the face-down tray 19 through the paper conveyer 25 by means of the paper discharge rollers 18.

The cleaning device 15 removes the toner remaining on the photosensitive drum 10 after the toner image is transferred. Thus, the photosensitive drum 10 can be ready for another printing operation.

When copy sheets are to be supplied into the paper cassette 1, the face-down tray 19 is rotated about a pivot 19*b* toward the direction indicated by the arrow A in FIG. 1, so that the inside of the paper cassette 1 is exposed as shown in FIG. 2. Since the paper supply roller 5 is attached to the face-down tray 19, it naturally moves away from the paper cassette 1 together with the face-down tray 19, so that it does not interfere with the copy sheets while they are being placed in the paper cassette 1. Thus, copy sheets can be readily supplied to the paper cassette 1. When the face-down tray 19 is rotated back onto the paper cassette 1, the paper supply roller 5 faces the copy sheets within the paper cassette 1, and the paper cassette 1 is ready for another printing operation.

When toner is to be supplied to the developing device 13, or when a printing apparatus is jammed with copy paper and they are to be removed, the face-down tray 19 is rotated toward the direction of the arrow A to be in the position shown in FIG. 2, and the paper cassette 1 is removed with its lower end turned upward. The mirror 3 is taken out together with the paper cassette 1. Then, toner can be supplied to the developing device 13, or the jammed copy sheets can be removed. When the paper cassette 1 is placed back within the housing 26, the mirror 3 is located in such a place that it reflects the laser beams emitted from the semiconductor laser 12 to the photosensitive drum 10. In this arrangement, the guide-wall member 2 on the lower-side wall of the paper cassette 1 faces the conveyer changing member 23 at a certain distance, defining a part of the paper conveyer 25, and the paper discharge roller 4 attached to the guide-wall member 2 is in contact with the paper discharge roller 17 attached to the housing 26 in such a manner that one rotates in accordance with the rotation of the other.

When the face-down tray 19 is rotated downward onto the paper cassette 1, the latter is covered with the former so that dust or other foreign substances will not enter the paper cassette 1.

Because the face-down tray 19 of this example is made of transparent resin, the quantity of the paper within the paper cassette 1 can be observed through the face-down tray 19.

EXAMPLE 2

Figure 3:
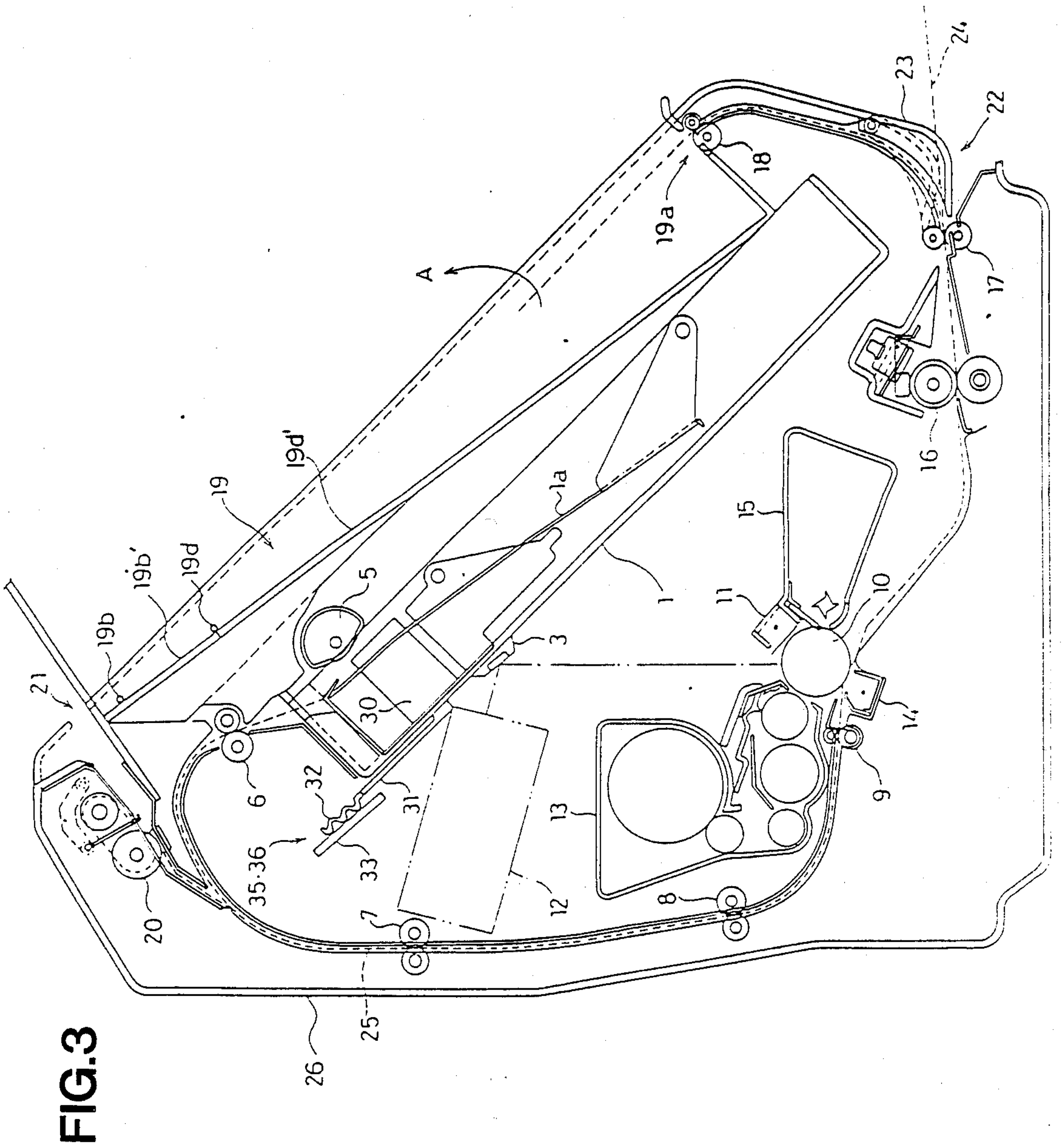
FIG. 3 is a sectional view of another printing apparatus of this invention.

FIGS. 3 and 4 show another printing apparatus of this invention.

In a printing apparatus of this example, the upper portion 19*b*' of the face-down tray 19 can be rotated about the pivot 19*b* and the lower portion 19*d*' of the face-down tray 19 is pivotably connected to the upper portion 19*b*' at a pivot 19*d*. The paper supply roller 5 is mounted on the back of the upper portion 19*b*'.

A paper size detecting plate 30 is disposed within the paper cassette 1 in the vicinity of the upper-side wall thereof in such a manner that it extends parallel to each side wall of the paper cassette 1. The paper size detecting plate 30 can slide in the paper-width direction so that it presses the paper against one of the side walls of the paper cassette 1.

Figure 4A:
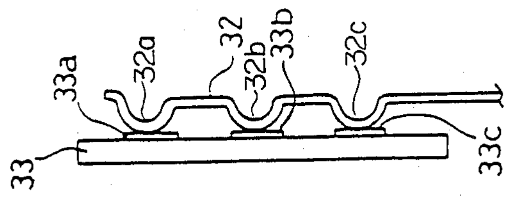
FIG. 4*a* is a side view showing a switching member on the switching plate of the printing apparatus shown in FIG. 3.
Figure 4B:
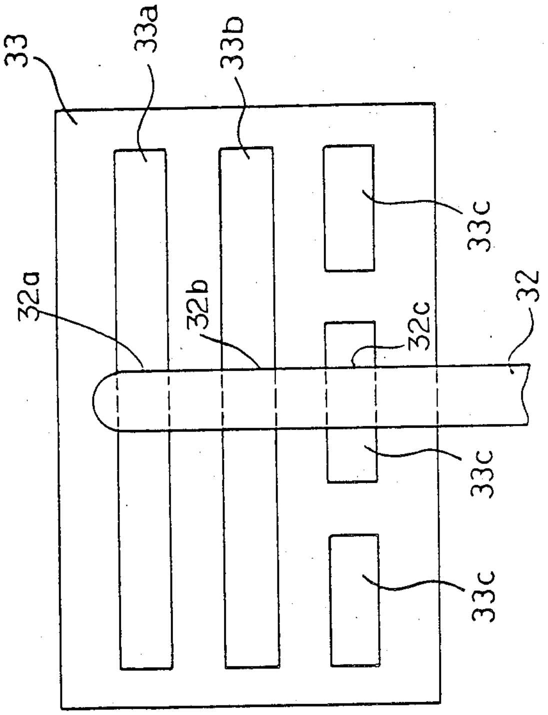
FIG. 4*b* is a sectional view showing the switching plate and the switching member of FIG. 4*a*.

A coupling member 31 is connected to the bottom of the paper size detecting plate 30 in such a manner that it extends through the bottom of the paper cassette 1 toward the direction of paper transportation. The other end of the coupling member 31 is provided with a metal switching member 32. The switching member 32 can slide together with the paper size detecting plate 30 in the paper-width direction. The switching member 32 has three switching points 32*a*, 32*b*, and 32*c* aligned in that order toward the direction of the paper cassette 1 as shown in FIG. 4*a*. A switching plate 33 is disposed under the switching member 32 as shown in FIG. 4*b*. The switching plate 33 is provided with electrodes 33*a* and 33*b* continuously extending in the paper-width direction, and a plurality of electrodes 33*c* . . . arranged in a line in a corresponding direction. The electrodes 33*a* and 33*b* can be in contact with the switching points 32*a* and 32*b*, respectively, and one of the electrodes 33*c*

. . . can be in contact with the switching point 32c. The electrodes 33c are arranged in such a manner that one of them is aligned with the paper size detecting plate 30 and comes into contact with the switching point 32c when the paper cassette 1 is placed within the housing. Which one of the electrodes 33c will come into contact with the switching point 32c depends on the position of the paper size detecting plate 30, which is moved in accordance with the width of copy sheets. Thus, the electrode 33c to be in contact with the switching point 32c is determined by the width of copy sheets. The electrodes 33a and 33b, and the switching points 32a and 32b constitute a paper cassette checking means 36 which checks that the paper cassette 1 is properly placed. The electrodes 33c . . . and the switching point 32c constitute a paper size detecting means 35.

Other arrangements in a printing apparatus of this example are the same as in Example 1.

When copy sheets are to be supplied into the paper cassette 1, the lower portion 19d' of the face-down tray 19 is first rotated toward the direction indicated by the arrow A about the pivot 19d, and then new copy sheets are placed in the paper cassette 1. At this time, one side of the copy sheets is in contact with one of the side walls of the paper cassette 1. Then, the paper size detecting plate 30 is slid into contact with the other side of the copy sheets, and accordingly the coupling member 31 and the switching member 32 move together with the paper size detecting plate 30, so that the switching member 32 comes into contact with the electrode 33a, 33b, and one of the electrodes 33c as shown in FIG. 4a. As a result, the switching member 32 is electrified in its portion between the switching points 32a and 32c. Among the plurality of the electrodes 33c . . . , as described above, the electrode 33c to be in contact with the switching point 32c of the switching member 32 is determined in accordance with the width of the paper. When the portion between the switching points 32b and 32c is electrified, it can be recognized which one of the electrodes 33c is in contact with the switching member 32, so that the width of the paper can be detected. When the portion between the switching points 32a and 32b is electrified, it can be recognized that the paper cassette 1 is properly placed within the housing 26.

When a printing apparatus of this example is jammed with copy paper and they are to be removed, the upper portion 19b' of the face-down tray 19 is rotated upward about the pivot 19b together with the lower portion 19c', and then the paper cassette 1 is removed from the housing 26 with its lower end turned upward first. Then, the jammed copy sheets can be removed. At the time when the paper cassette 1 is removed from the housing 26, the switching member 32 is separated from the electrodes 33a and 33b, and the electric current stops going through the portion between the switching points 32a and 32b, which indicates that the paper cassette 1 is removed. When the paper cassette 1 is placed back within the housing 26 after the jammed sheets are removed, the switching points 32a and 32b of the switching member 32 come into contact with the electrodes 33a and 33b, respectively, so that the portion between the switching points 32a and 32b are electrified, which indicates that the paper cassette 1 is properly placed.

As described above, with a printing apparatus of this example, a single member functions as the paper size detecting means 35 for detecting the width of paper and as the paper cassette checking means 36 for checking that the paper cassette 1 is properly placed. Thus, these two means only require space for a single member and can be mounted to the housing 26 by just a single mounting member, and accordingly, the wiring thereof can be simplified so that the structure of the whole printing apparatus can be simplified. This makes it easier to manufacture printing apparatuses, resulting in a reduced production cost.

In this example, the switching member 32 having the switching points is attached to the coupling member 31 which is fixed to the bottom of the paper width detecting plate 30, and the switching plate 33 is placed under the switching member 32. A printing apparatus of the invention, however, need not include the switching member 32 or the coupling member 31, and the switching points can be directly attached to the bottom of the paper size detecting plate 30 so that the switching plate 33 can be placed immediately under the paper cassette 1. The arrangement of the electrodes on the switching plate 33 is not limited to that described above.

EXAMPLE 3

Figure 5:
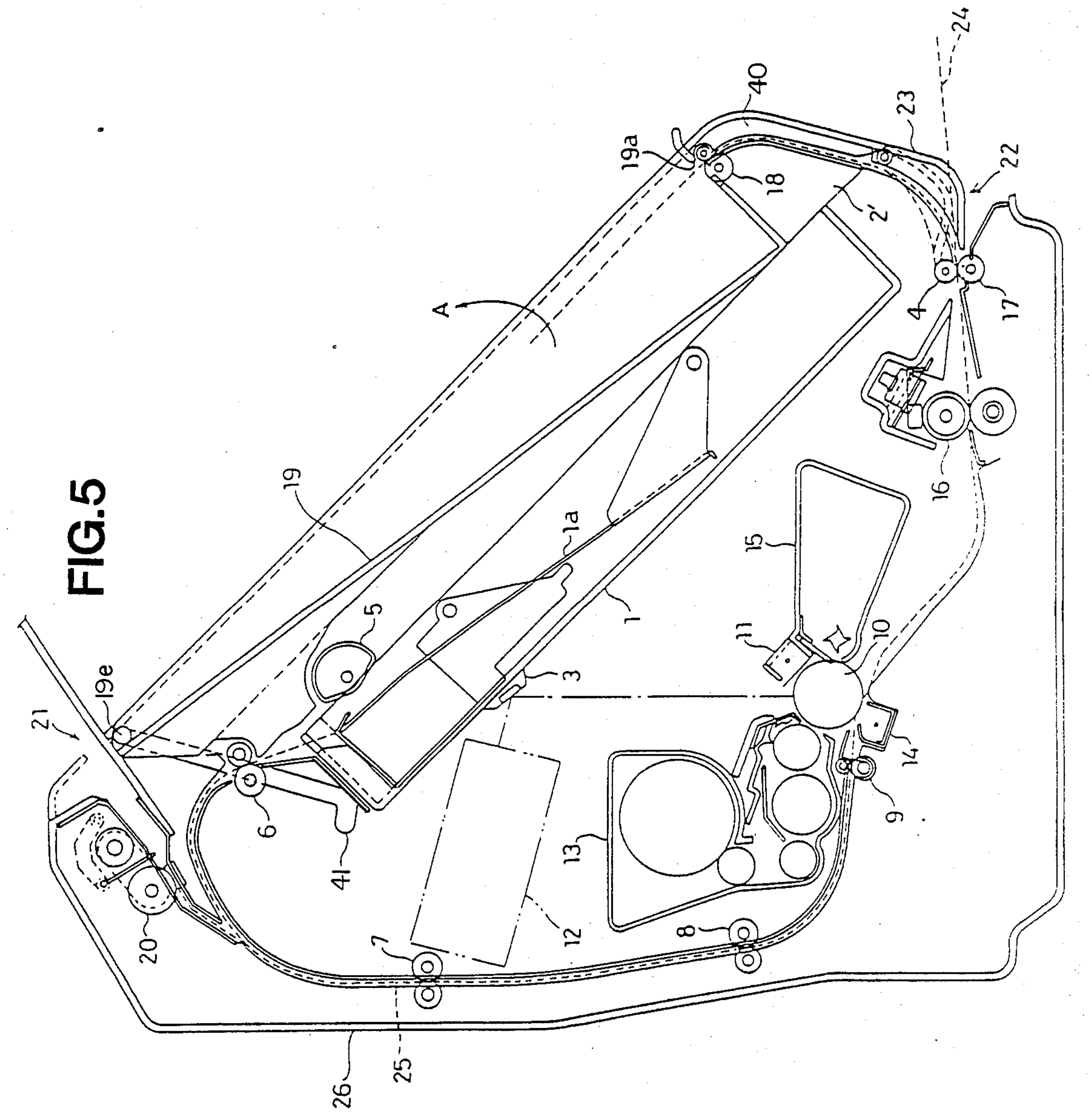
FIG. 5 is a sectional view of still another printing apparatus of this the invention.
Figure 6:
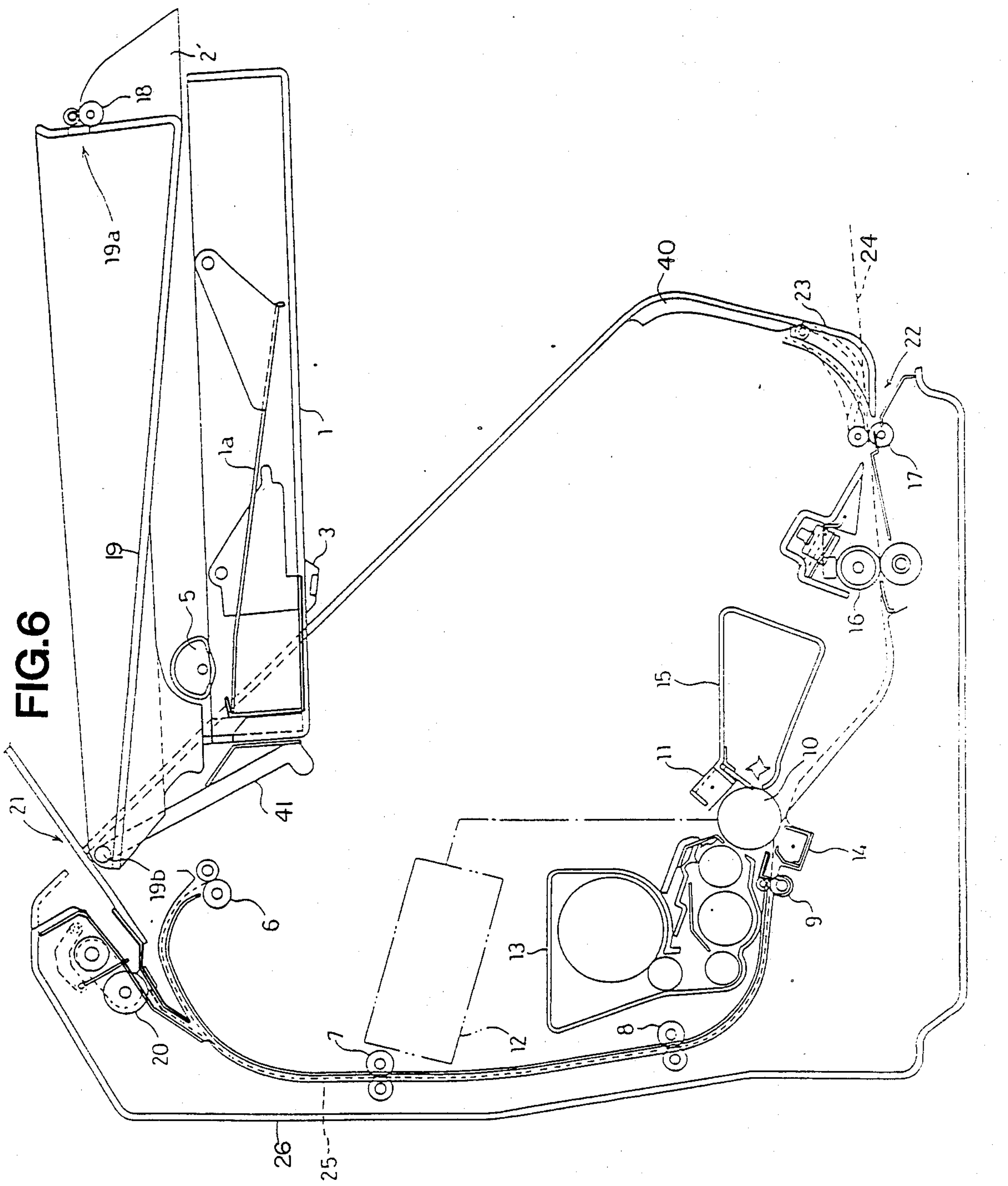
FIG. 6 is a schematic diagram illustrating the functions of a face-down tray and a paper cassette of the printing apparatus shown in FIG. 5.

FIGS. 5 and 6 show still another printing apparatus of this invention.

With a printing apparatus of this example, the face-down tray 19 can be rotated upward and downward about a pivot 19e. While the guide-wall member 2 of Examples 1 and 2 is mounted to the lower-side wall of the paper cassette 1, a guide-wall member 2' of this example is mounted to the lower-side wall of the face-down tray 19 as shown in the figures. The upper paper discharge roller 4 is attached to the housing 26.

Another guide-wall member 40 is mounted on the housing 26 in such a manner that it faces the guide-wall member 2' at a certain distance. The space between the guide-wall member 40 and the guide-wall member 2' functions as a part of the paper conveyer 25.

A supporting arm 41 is connected to the pivot 19e of the face-down tray 19 at one of its ends. The other end of the supporting arm 41 is connected to the upper-side wall of the paper cassette 1. Thus, the paper cassette 1 can be rotated upward about the pivot 19e by being supported by the supporting arm 41. When the paper cassette 1 is rotated upward to be substantially horizontal as shown in FIG. 6, it stops and is kept in the position by the supporting arm 41.

Other arrangements in a printing apparatus of this example are the same as in Example 1.

When the paper conveyer 25 is jammed with paper sheets and they are to be removed, or when toner is to be supplied into the developing device 13, the face-down tray 19 is first rotated in the direction indicated by the arrow A (See FIG. 5), and then the paper cassette 1 is rotated toward the same direction. Then, as described above, the paper cassette 1 is kept substantially horizontal as shown in FIG. 6 by the supporting arm 41, so that the jammed paper can be removed or toner can be supplied.

When copy sheets are to be supplied into the paper cassette 1, the paper cassette 1 is first rotated together with the face-down tray 19 and is kept substantially horizontal. Thereafter, the face-down tray 19 is further rotated upward. In this way, the paper cassette 1 is kept substantially horizontal and the inside thereof is exposed, so that new copy sheets can be readily placed therein.

As described above, with a printing apparatus of this example, the paper cassette 1 can be rotated by being supported by the supporting arm 41, so that it need not be connected to the housing 26. Thus, mounting members for detachably mounting the paper cassette 1 within the housing 26 are not required. This simplifies the structure of the whole printing apparatus, resulting in a reduced production cost.

In this example, the face-down tray 19 and the paper cassette 1 are both rotated about the pivot at their upper ends, but other arrangements without pivots are also applicable as long as they can be rotated upward and downward.

EXAMPLE 4

Figure 7:
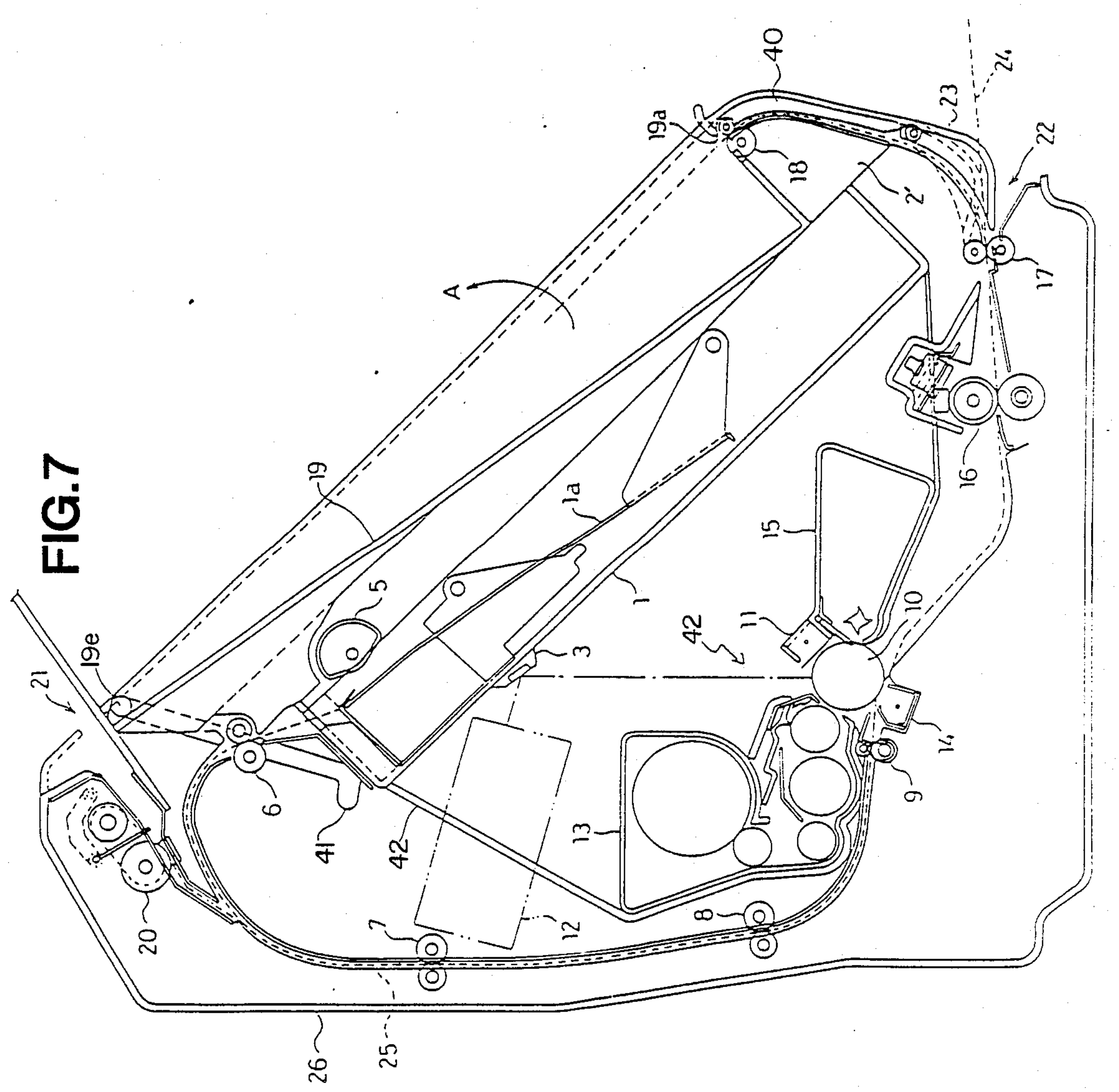
FIG. 7 is a sectional view of still another printing apparatus of this invention.
Figure 8:
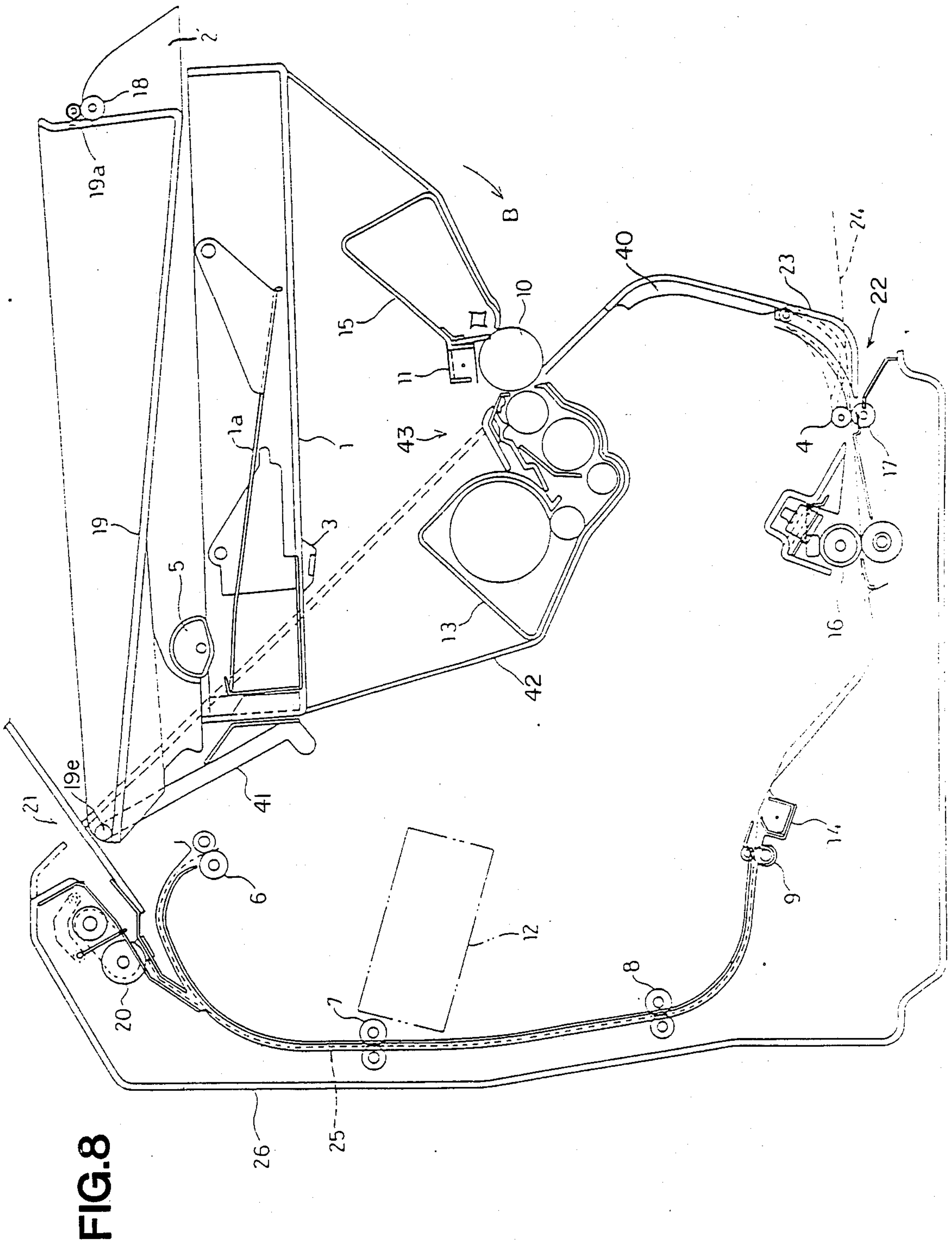
FIGS. 8 and 9 are schematic diagrams illustrating the functions of a face-down tray and a paper cassette of the printing apparatus shown in FIG. 7.
Figure 9:
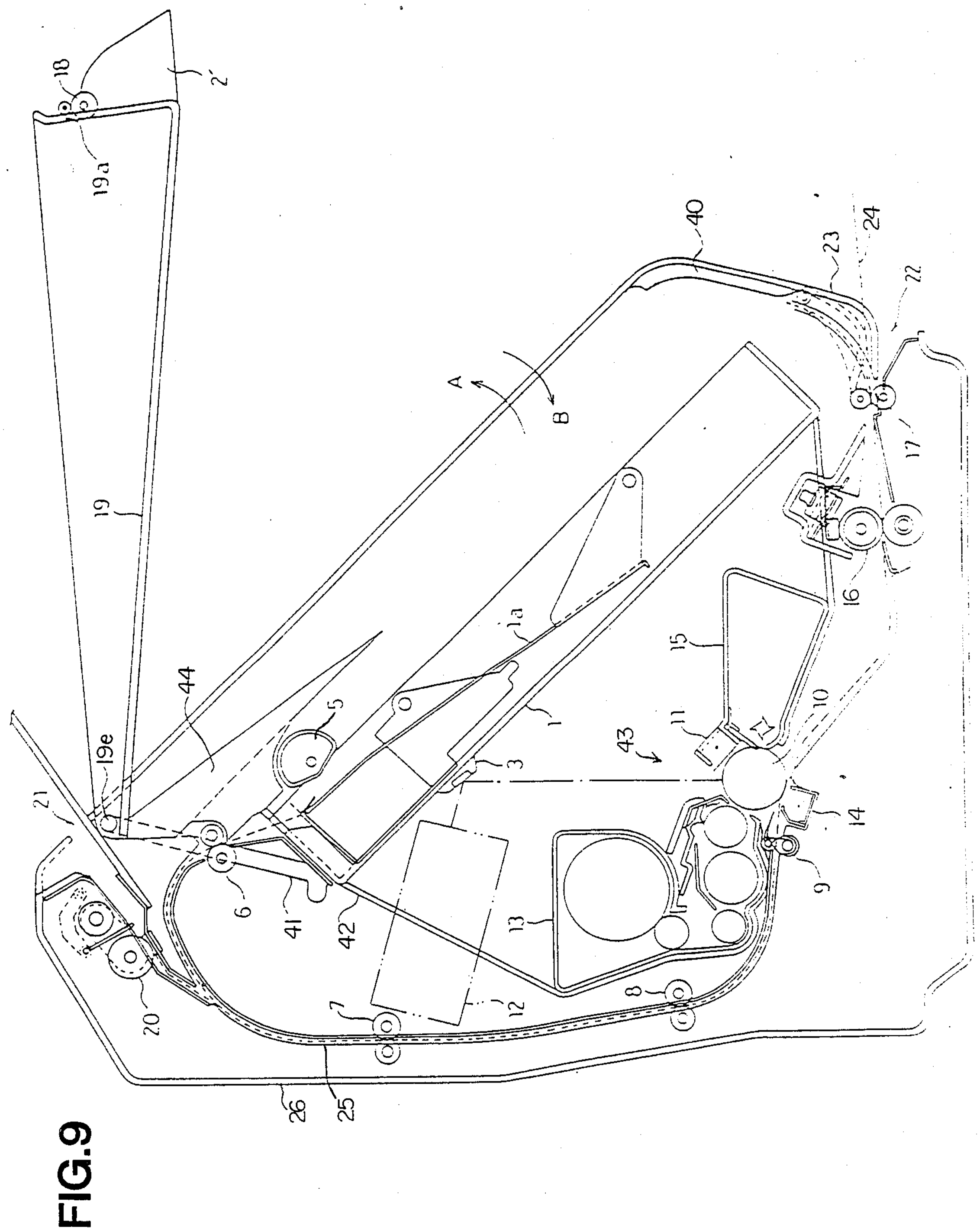

FIGS. 7, 8 and 9 show still another printing apparatus of the invention.

In a printing apparatus of this example, the developing process section comprising the photosensitive drum 10, the main charger 11, the developing device 13, the transfer charger 14, and the cleaning device 15 is placed within a frame member 42. Both ends of the frame member 42 are connected to the corresponding ends of the paper cassette 1. Thus, as the paper cassette 1 is rotated upward or downward, the frame member 42 containing the developing process section 43 is rotated together with it. The paper supply roller 5 is attached to a supporting member 44 which is connected to the pivot 19e.

The other arrangements in an apparatus of this example are the same as in Example 3.

When a printing apparatus of this example is jammed with copy paper and they are to be removed, the face-down tray 19 is first rotated in the direction of the arrow A as shown in FIG. 9, and the paper cassette 1 is then rotated in the same direction until it comes to be substantially horizontal, at which position it is maintained by the supporting arm 41 as shown in FIG. 8. Thus, the inside of the housing 26 is exposed so that the jammed paper within the paper conveyer 25 can be readily removed. When the paper cassette 1 is maintained to be substantially horizontal, copy sheets can also be readily supplied into the paper cassette 1. After the jammed copy sheets are removed or new sheets are supplied, the supporting arm 41 is rotated downward so that the paper cassette 1 is rotated in the direction indicated by the arrow B shown in FIG. 9. In this way, the developing process section 43 is placed back onto the paper conveyer 25 within the housing 26. Thereafter, the face-down tray 19 is rotated back toward the direction indicated by the arrow B so that the whole printing apparatus is ready for another printing operation.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A printing apparatus comprising: a housing in which an electrostatic image forming means is disposed, said image forming means including a light-emitting section for irradiating a photosensitive means to form a latent image and a developing process section for developing the latent image into a real image with toner, a paper receiving member disposed within the housing for receiving printed copy sheets, a paper cassette for holding copy sheets to be printed, disposed on the back of the paper receiving member so that the copy sheets are covered with the paper receiving member, and a paper conveyer disposed below the paper cassette for transporting copy sheets from the paper cassette to the paper receiving member, said image forming means being placed between the paper cassette and the paper conveyer so that the toner image is transferred onto a copy sheet passing through the paper conveyer.

2. A printing apparatus according to claim 1, wherein said housing is substantially right-angled triangular in section, and said paper receiving member and the paper cassette are disposed along the inclined surface of the housing.

3. A printing apparatus according to claim 2, wherein the upper portion of said paper receiving means is pivotably connected to the housing.

4. A printing apparatus according to claim 3, wherein said paper cassette is detachably mounted within the housing.

5. A printing apparatus according to claim 1, wherein a paper supply roller for transporting copy sheets out of the paper cassette is placed on the back of the paper receiving member.

6. A printing apparatus according to claim 4, wherein a pair of paper discharge rollers for transporting a copy sheet on which a toner image is formed by the image forming means toward the predetermined direction are disposed below the lower end of the paper cassette, one of said paper discharge rollers being incorporated into the paper cassette.

7. A printing apparatus according to claim 4, wherein a pair of guide-wall members defining a part of the paper conveyer are disposed below the paper cassette, one of said guide-wall members being incorporated into the paper cassette.

8. A printing apparatus according to claim 4, wherein said image forming means includes a laser beam-emitting means as the light-emitting section, and laser beams emitted from the laser beam-emitting means are reflected by a mirror attached to the back of the paper cassette to illuminate the photosensitive means so that a latent image is formed on the photosensitive means.

9. A printing apparatus according to claim 4, wherein a paper size detecting member which can slide in the paper-width direction is disposed within the paper cassette so as to detect the width of the copy paper and to check that the paper cassette is properly placed within the housing.

10. A printing apparatus according to claim 3, wherein said paper cassette is pivotably connected to the housing at its upper end.

11. A printing apparatus according to claim 10, wherein said paper cassette and said paper receiving member are rotatably connected to the housing at a single pivot.

12. A printing apparatus according to claim 10, wherein at least the developing process section is held below said paper cassette by a supporting means.

* * * * *